United States Patent [19]

Mochida et al.

[11] Patent Number: 5,092,147
[45] Date of Patent: Mar. 3, 1992

[54] STEERING LOCK

[75] Inventors: Haruo Mochida, Kanagawa; Yoshio Watanuki, Ebina; Etsuo Nara; Mikio Masaki, both of Tokyo; Mitsuo Kamata, Chigasaki; Taizo Wada, Tokyo, all of Japan

[73] Assignees: Nissan Motor Co., Ltd., Yokohama; Kokusan Kinzoku Kogyo Kabushiki Kaisha, Tokyo; Nissan Shatai Company, Limited, Hiratsuka, all of Japan

[21] Appl. No.: 606,954

[22] Filed: Oct. 31, 1990

Related U.S. Application Data

[63] Continuation-in-part of Ser. No. 136,519, Dec. 22, 1987, abandoned, which is a continuation of Ser. No. 733,810, May 14, 1985, abandoned, which is a continuation-in-part of Ser. No. 235,693, Aug. 22, 1988, abandoned, which is a continuation of Ser. No. 775,308, Sep. 12, 1985, abandoned.

[51] Int. Cl.$^5$ .............................................. B60R 25/02
[52] U.S. Cl. ......................................... 70/252; 74/527
[58] Field of Search ................. 70/252, 379 A, 379 R, 70/380; 74/753, 527, 503, 504

[56] References Cited

U.S. PATENT DOCUMENTS

| | | | |
|---|---|---|---|
| 2,751,795 | 6/1956 | Powell | 74/503 |
| 3,059,558 | 10/1962 | Fahlenberg et al. | 74/753 |
| 3,602,245 | 8/1971 | Meisel | 74/527 X |
| 3,673,829 | 7/1972 | Mizuno | 70/252 |
| 3,789,636 | 2/1974 | Nakashima | 70/252 |
| 3,844,180 | 10/1974 | Williams et al. | 74/504 |
| 4,250,976 | 2/1981 | Mochida | 74/527 |
| 4,487,042 | 12/1984 | Mochida et al. | 70/252 |
| 4,495,786 | 1/1985 | Masaki et al. | 70/252 |

FOREIGN PATENT DOCUMENTS

| | | | |
|---|---|---|---|
| 110835 | 6/1984 | European Pat. Off. | 70/277 X |
| 2212852 | 9/1972 | Fed. Rep. of Germany | 70/252 |
| 2801531 | 7/1979 | Fed. Rep. of Germany | 70/252 |

*Primary Examiner*—Gary L. Smith
*Assistant Examiner*—Suzanne L. Dino
*Attorney, Agent, or Firm*—Leydig, Voit & Mayer

[57] ABSTRACT

A steering lock device includes a housing and a key cylinder rotatably disposed in the housing. A generally cylindrical member is rotatably disposed within the housing coaxially with the key cylinder. The cylindrical member includes an outer wall with a groove having a first circumferential groove section, a second circumferential groove section axially spaced from the first circumferential groove section, and a junction section connecting the first and second circumferential groove sections. A first surface is disposed at one end of the first groove section at the junction section and inclined at a predetermined angle to the first groove section, and a second surface is disposed at the end of the second groove section at the junction section and arranged generally perpendicular to the second groove section. A latch is slidably disposed within the housing and includes a first end projecting outwardly from the housing and a second end projecting within the groove in the outer wall of the cylindrical member.

27 Claims, 4 Drawing Sheets

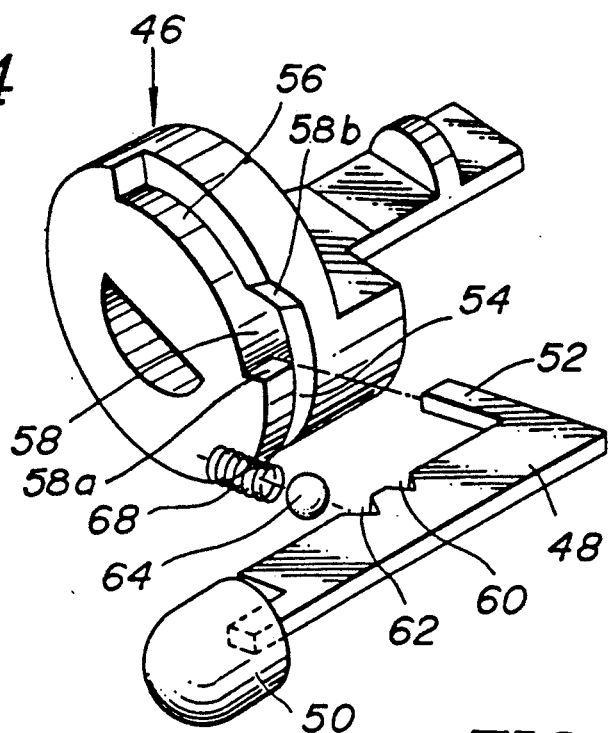
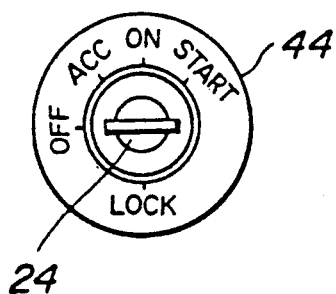
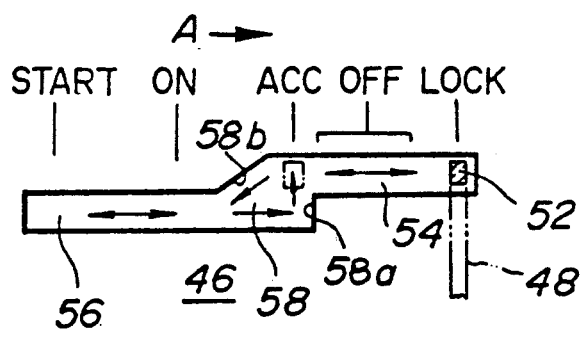
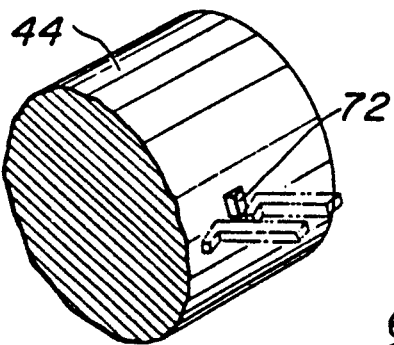
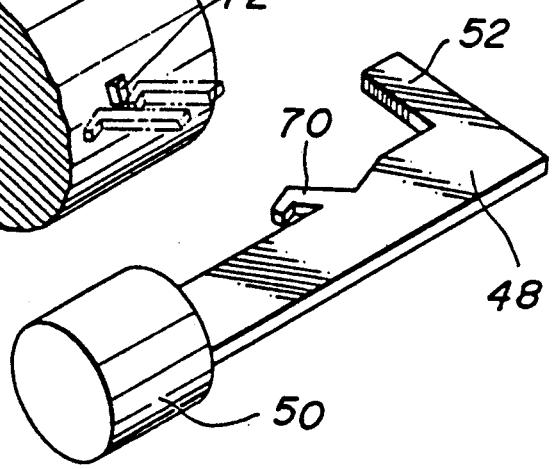

STEERING LOCK

CROSS-REFERENCE TO RELATED APPLICATIONS

This is a continuation-in-part of U.S. Pat. application Ser. No. 07/136,519, filed on Dec. 22, 1987, now abandoned, which is a continuation of U.S. Pat. application Ser. No. 06/733,810, filed on May 14, 1985, now abandoned, and of U.S. Pat. application Ser. No. 07/235,693, filed on Aug. 22, 1988, now abandoned, which is a continuation of U.S. Pat. application Ser. No. 06/775,308, filed on Sept. 12, 1985, now abandoned. Each of these applications is incorporated by reference.

BACKGROUND OF THE INVENTION

The present invention relates in general to a steering lock for a wheeled motor vehicle, and more particularly to a steering lock of the type having a safety mechanism which can prevent unexpected dangerous locking of the steering shaft due to inadvertent manipulation of the ignition key in the key cylinder during cruising of the vehicle.

Hitherto, various kinds of steering locks have been proposed and put to actual use. These devices provide theft protection by locking the steering shaft to prevent its manipulation when the ignition key in a key cylinder is turned to a locking position (LOCK) or withdrawn from the key cylinder.

Some steering locks are equipped with a safety system in order to prevent inadvertent turning of the key toward the LOCK position and/or the withdrawal of the key which may cause the dangerous locking of the steering shaft during cruising of the vehicle. However, some of these locks are troublesome for the driver of the vehicle to operate.

SUMMARY OF THE INVENTION

It is therefore an objection of the present invention to provide a steering lock having an improved safety mechanism which can be easily operated.

A steering lock device according to the present invention includes a housing and a key cylinder rotatably disposed in the housing. A generally cylindrical member is rotatably disposed within the housing coaxially with the key cylinder. The generally cylindrical member includes an outer wall with a groove having a first circumferential groove section, a second circumferential groove section axially spaced from the first circumferential groove section, and a junction section connecting the first and second circumferential groove sections. A first surface is disposed at one end of the first groove section at the junction section and inclined at a predetermined angle to the first groove section, and a second surface is disposed at the end of the second groove section at the junction section and arranged generally perpendicular to the second groove section. A latch is slidably disposed within the housing and includes a first end projecting outwardly from the housing and a second end projecting within the groove in the outer wall of the generally cylindrical member.

The generally cylindrical member can rotate together with the key cylinder to lock a steering shaft when turned to a given angular position (a LOCK position). In preferred embodiments, the first groove section receives the projection when the generally cylindrical member assumes the LOCK position, and the second groove section receives the projection when the generally cylindrical member assumes a different angular position, such as a START position. Upon rotation of the key cylinder away from the LOCK position, the projection contacts the first surface and is shifted from the first groove section to the second groove section.

The latch may have an enlarged operating end which can be manipulated by the driver of the vehicle in which the steering lock is installed to move the projection of the latch between the second groove section and the first groove section. A detent mechanism may also be provided to maintain the projection in the first or the second groove section.

In preferred embodiments, the generally cylindrical member can be rotated between a LOCK position and a START position via an OFF position, an ACC (accessory) position, and an ON position. The junction section may be located such that the projection of the latch is in the junction section when the generally cylindrical member is rotated to the proximity of the ACC position or the OFF position.

BRIEF DESCRIPTION OF THE DRAWINGS

Other objects and advantages of the present invention will become apparent from the following description when considered in conjunction with the accompanying drawings, in which:

FIG. 4 is an exploded perspective view of a portion of the steering lock of the present invention;

FIG. 5 is a schematic view of a guide groove formed about the cylindrical outer wall of a rotating member of the embodiment of FIG. 3;

FIG. 6 a front view looking in the direction of arrow VI of FIG. 3;

FIG. 7 is an exploded perspective view of a modified detent mechanism which is applicable to the steering lock of the present invention;

DESCRIPTION OF THE PREFERRED EMBODIMENTS

Prior to describing in detail the construction of the steering lock of the present invention, some conventional steering locks will be briefly described with reference to the drawings.

Figure 1:
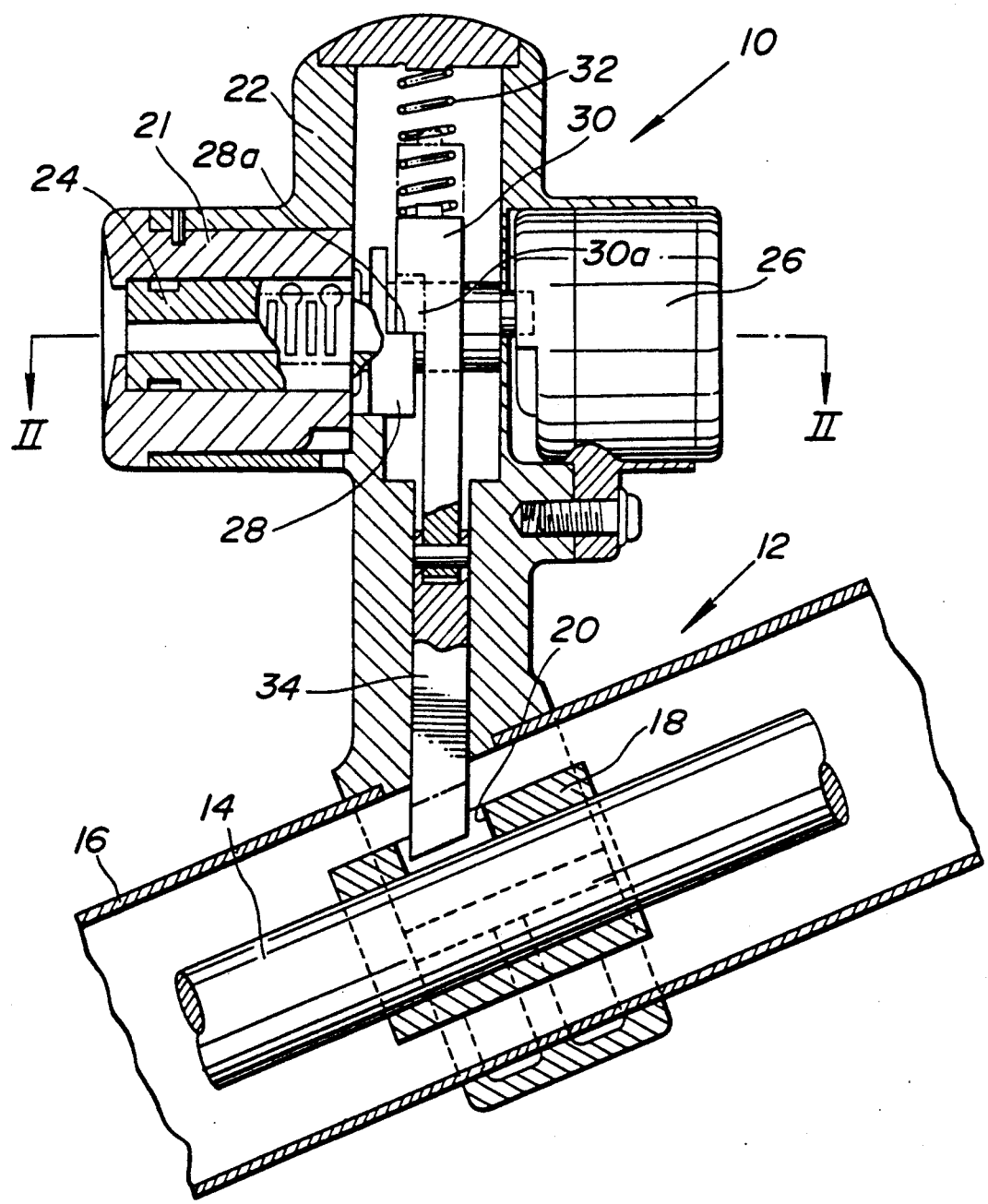
FIG. 1 is a sectional view of a conventional steering lock mounted on a steering column assembly, showing the state in which the steering shaft is locked.
Figure 2:
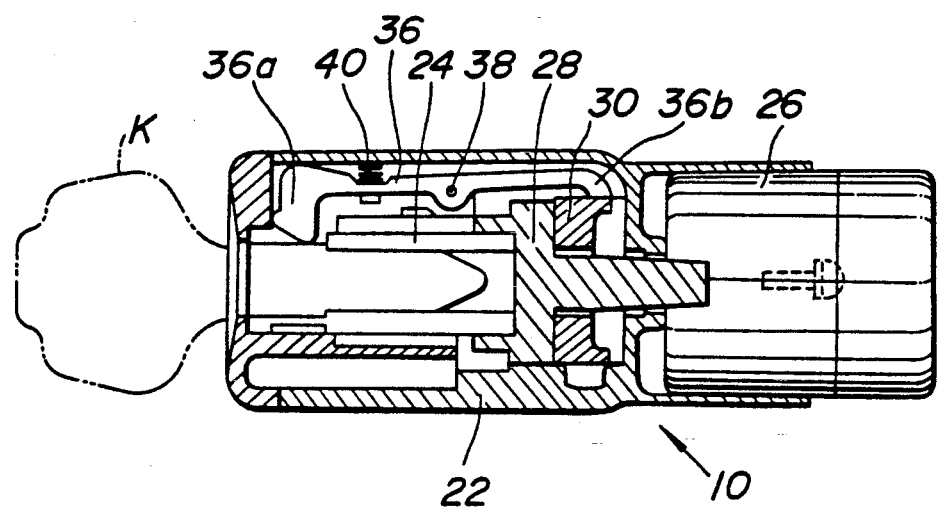
FIG. 2 is a sectional view taken along Line II—II of FIG. 1.

FIGS. 1 and 2 show a conventional steering lock 10 which is mounted on a steering column assembly 12. The steering column assembly 12 comprises a steering shaft 14 and a steering column 16 which are assembled in a known manner. A collar 18 having a recess 20 is secured about the steering shaft 14 to rotate therewith.

The steering lock 10 comprises a casing 22 secured to the steering column assembly 12, a key cylinder 24 disposed in a cylindrical holder 21 in the casing 22 so as to be rotatable about the axis thereof, and a switch unit 26 mounted on the casing 22 facing the key cylinder 24. A rotating member 28 is disposed between the key cylinder 24 and the switch unit 26 so that rotation of the key cylinder 24 rotates the rotating member 28 and controls the switch unit 26. The rotation of the key cylinder 24 is permitted only when a specific key (not shown) is inserted into the key cylinder 24. The rotating member 28 is formed with a cam portion 28a which supports a projection 30a formed on a hanger rod 30. The hanger rod 30 is biased downward in FIG. 1 by a spring 32. A locking bolt 34 is bolted to the hanger rod 30 so that when the rotating member 28 assumes a given angular position (a LOCK position as shown in FIG. 1), the lower end of the locking bolt 34 is inserted into the recess 20 of the collar 18. In this state, the steering shaft 14 is locked to prevent theft.

As shown in FIG. 2, a key sensor lever 36 is disposed beside the key cylinder 24. It pivots about a pivot 38 with its first end 36a insertable into a key hole of the key cylinder 24 and its second end 36b engageable with the hanger rod 30. A spring 40 biases the key sensor lever 36 in a direction to put the first end 36a into the key hole. Thus, when the key K is inserted into the key cylinder 24 as shown in FIG. 2, the key sensor lever 36 is urged to pivot clockwise, i.e., in a direction to engage the second end 36b with the hanger rod 30, thereby holding the hanger rod 30 and the locking bolt 34 in the unlocked position in which the lower end of the locking bolt 34 is disengaged from the recess 20 of the collar 18. Thus, the steering shaft 14 is kept unlocked so long as the key K is operatively engaged with the key cylinder 24. When the key K is pulled out from the key cylinder 24, the first end 36a of the key sensor lever 36 is inserted into the key hole of the cylinder 24 by the force of the spring 40, thereby disengaging the second end 36b of the key sensor lever 36 from the hanger rod 30. In this condition, the locking bolt 34 is permitted to move toward the recess 20 of the collar 18 and lockingly engage with the collar 18 as shown in FIG. 1.

However, the above-described conventional steering lock has the drawback that when the key K is accidentally turned to the LOCK position or pulled out from the key cylinder 24 when the vehicle is cruising, the locking bolt 34 locks the steering shaft 14 and prevents the vehicle from being steered. This is very dangerous.

Various devices have been proposed in order to eliminate this problem. One is a so-called "double-action steering lock" which is disclosed in U.S. Pat. No. 3,673,829. In that device, once a key is inserted into a key cylinder, the turning of the key to the LOCK position or the removal of the key from the key cylinder becomes impossible unless a separate manually-operated latch is manipulated. However, it is troublesome to turn the key to the START position after manipulation of the latch. Namely, once the manually-operated latch is manipulated, the key can not be turned toward the START position unless the key is first turned back to the LOCK position. In addition to this drawback, the production cost of that device is high due to the complicated parts which it employs.

Figure 3:
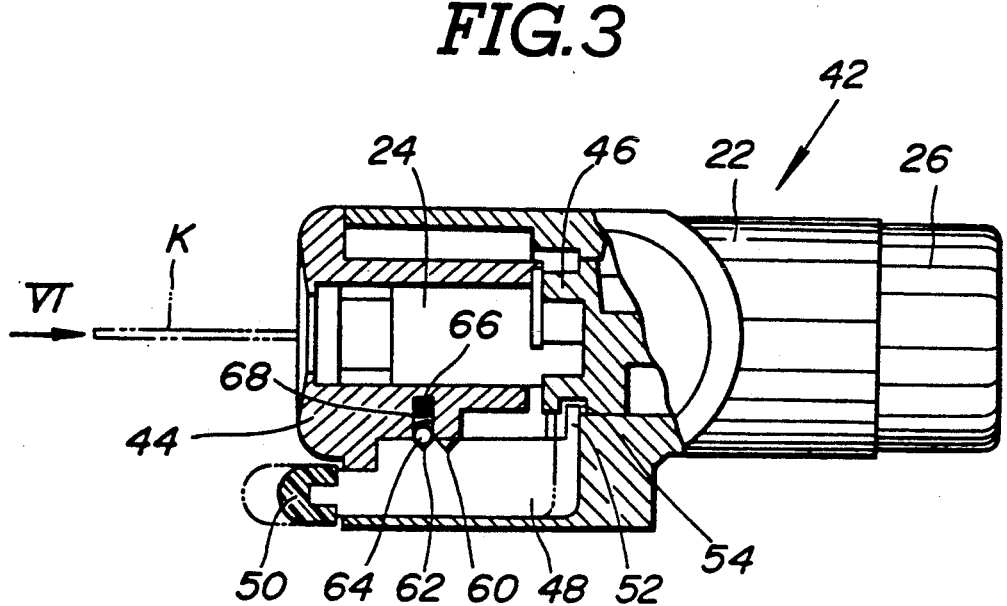
FIG. 3 is a partially sectional view of a steering lock according to the present invention.

FIGS. 3 to 5 illustrate a first embodiment of an improved steering lock according to the present invention that can eliminate the above-described problems of conventional steering locks. For simplicity, parts which are substantially the same as those shown in FIGS. 1 and 2 are designated by the same reference numerals.

As shown in FIG. 3, the improved steering lock 42 has a housing which includes a casing 22 securely mounted on an unillustrated steering column assembly. A cylindrical holder 44 fits tightly inside the casing 22, a key cylinder 24 is rotatably disposed in the holder 44, and a switch unit 26 is mounted on the casing 22 facing the key cylinder 24.

A rotating member 46 is disposed between the key cylinder 24 and the switch unit 26 so that rotation of the key cylinder 24 induces rotation of the rotating member 46 and controls the switch unit 26. A manually-operated latch 48 is disposed in the casing 22 beside the cylinder holder 44 so as to be somewhat movable in a direction parallel with the axis of the key cylinder 24. As shown in FIG. 3, one end of the latch 48 extends to the outside of the casing 22 and has a knob 50 disposed thereon. The latch 48 and the rotating member 46 are engaged with each other in a manner to be described below.

As best shown in FIG. 4, the latch 48 has a projection 52 at its inner end which is bent toward the rotating member 46 at a right angle relative to the body of the latch 48. Upon assembly, the leading end of the projection 52 is slidably received in a groove which is formed in the cylindrical outer wall of the rotating member 46. The groove comprises a first groove section 54, a second groove section 56, and a junction section 58. The first and second groove sections 54 and 56 are separated from each other in both the axial and circumferential directions of the rotating member 46 and are connected with each other by the junction section 58. For simplicity, the first and second groove sections 54 and 56 will be referred to as locking and unlocking groove sections, respectively.

FIG. 5 schematically shows the contour of the groove of the rotating member 46. This drawing shows the state when the rotating member 46 and thus the key cylinder 24 assume a LOCK position and the projection 52 of the latch 48 is placed at the leading end of the locking groove section 54. The marks LOCK, OFF, ACC, ON, and START in FIG. 5 indicate the position of the projection 52 of the latch 48 in the groove when the key cylinder 24 and the rotating member 46 assume the LOCK, OFF, ACC, ON, or START positions, respectively, of FIG. 6. LOCK is an abbreviation for Steering Lock, OFF is an abbreviation for Switch Off, ACC is an abbreviation for Accessory Switch On, ON is an abbreviation for Ignition Switch On, and START is an abbreviation for Starter Motor On. As shown in FIG. 5, the projection 52 is at the ON or START position of the unlocking groove section 56 when the key cylinder 24 assumes the ON or START positions, respectively. The projection 52 is at the OFF or LOCK position of the locking groove section 54 when the key cylinder 24 is in its OFF or LOCK position, respectively. Furthermore, the projection 52 is in the ACC position of the junction section 58 when the key cylinder 24 is in its ACC position.

The portion of the junction section 58 which confronts the unlocking groove section 56 is formed with a flat stopper surface 58a which is perpendicular to the longitudinal axis of the unlocking groove section 56. The portion of the junction section 58 which confronts the locking groove section 54 is formed with a flat cam surface 58b which is inclined preferably at 45 degrees relative to the longitudinal axis of the locking groove section 54. When the rotating member 46 and the key cylinder 24 assume the LOCK position and the projection 52 of the latch 48 is disposed at the leading end of the locking groove section 54, the key K can be pulled out from the key cylinder 24. When the rotating member 46 is rotated in the direction of arrow A in FIG. 5 (toward the START position), the projection 52 of the latch 48 comes into contact with the cam surface 58b, and the projection 52 is urged to move into the unlocking groove section 56 and finally comes to the leading end (the leftmost end) of the unlocking groove section 56. Thus, during the rotation of the rotating member 46 in the direction of arrow A in FIG. 5, the latch 48 is shifted downward in the drawing, thereby causing the knob 50 to move outwards to the position indicated by a phantom line in FIG. 3.

A detent mechanism is employed in order to position the latch 48 at either of two positions. As shown in FIGS. 3 and 4, the detent mechanism comprises spaced first and second notches 60 and 62 formed in the body of the manually-operated latch 48 and a spring-biased ball 64 partially disposed in a hole 66 formed in the cylindrical holder 44. A coil spring 68 for biasing the ball 64 is disposed in the hole 66. With this mechanism, the latch 48 can be held stationary at a IN position shown by a solid line in FIG. 3 or an OUT position shown by a phantom line. If desired, another type of detent mechanism such as the one shown in FIG. 7 may be employed. In this mechanism, a resilient pawl 70 is integrally formed on the latch 48, and a small projection 72 is formed on the cylindrical holder 44. During the axial movement of the latch 48 between the IN position and the OUT position, the pawl collides against the projection 72 and is reliably maintained in position on one side or the other of the projection 72. The force of the collision is transmitted to the driver's hand when the pawl strikes against the projection 72, so the driver can tell by touch that the latch 48 has been moved between positions.

The operation of the steering lock of the present invention will now be described with reference to FIG. 5. First, the situation will be described in which the key cylinder 24 assumes the LOCK position. In this state, the projection 52 of the latch 48 is placed at the leading end of the locking groove section 54 as shown in FIG. 5, and the knob 50 of the latch 48 assumes the IN position.

When the key is manipulated to rotate the key cylinder 24 and the rotating member 46 toward the START position, the projection 52 of the latch 48 slides in the locking groove section 54 toward the junction section 58 and comes into contact with the cam surface 58b, and the projection 52 is shifted into the unlocking groove section 56. Further rotation of the key cylinder 24 in the same direction carries the projection 52 to the leading end of the unlocking groove section 56. Because of the provision of the cam surface 58b, the rotation of the key cylinder 24 toward the START position is permitted irrespective of any positions which the key cylinder 24 assumed prior to the rotation.

On the contrary, when the key cylinder 24 is rotated in the reverse direction from the START position for the purpose of stopping the engine, the projection 52 slides in the unlocking groove section 56 toward the junction section 58 and comes into contact with the stopper surface 58a so that further rotation of the key cylinder 24 is prevented. In this position, the operation of the engine stops. When the button 50 of the latch 48 is then pushed in, the projection 52 is shifted to the locking groove section 54 and is disengaged from the stopper surface 58a. In this condition, further rotation of the key cylinder 24 toward the LOCK position is permitted, and when the key cylinder 24 finally comes to the LOCK position, the key can be pulled out from the key cylinder 24. Once the projection 52 of the latch 48 is shifted to the locking groove section 54 by pushing the knob 50 inward, the latch 48 is maintained in the IN position by the detent mechanism. Thus, once the knob 50 is pushed in, further rotation of the key cylinder 24 toward the LOCK position can be achieved without manipulating the latch 48.

As is clear from the preceding description, due to the provision of the cam surface 58b in the groove of the rotating member 46, the turning of the key cylinder 24 toward the START position is permitted from any position which the key cylinder 24 assumed prior to the rotation.

Figure 8:
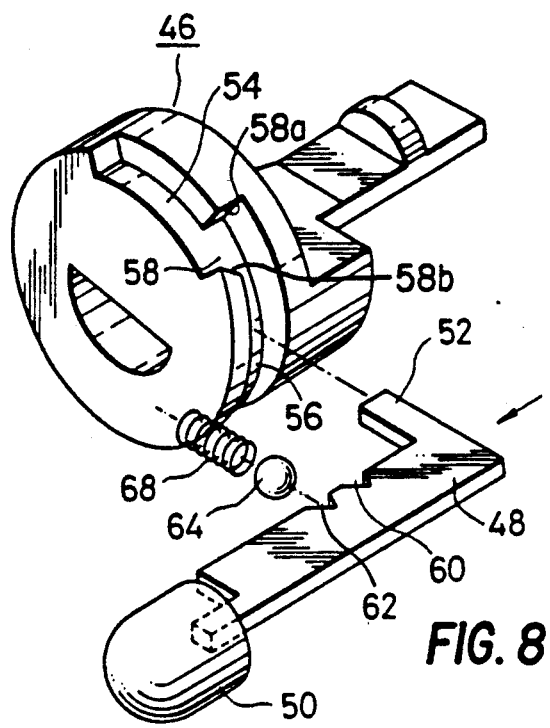
FIG. 8 is an exploded perspective view of the rotating member and latch of a second embodiment of the present invention.
Figure 10:
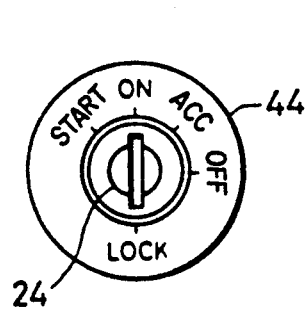
FIG. 10 is a view of the key cylinder of the embodiment of FIG. 8.
Figure 9:
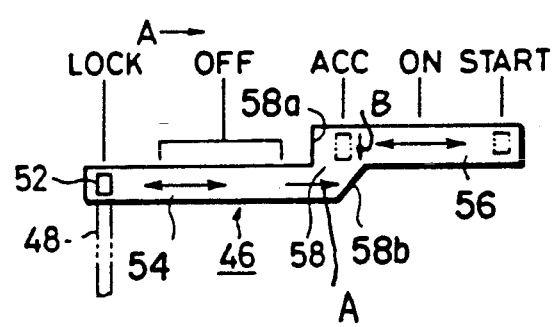
FIG. 9 is a schematic view of the guide groove of the embodiment of FIG. 8.

In the above-described embodiment, the driver of the vehicle pushes the latch 48 inwards in order to release the engagement between the projection 52 and the stopper surface 58a and enable the key cylinder 24 to be turned to the OFF and LOCK positions. FIGS. 8-10 illustrate portions of a second embodiment of the present invention in which the latch 48 is disengaged by being pulled outwards.

The overall structure of this embodiment is similar to that of the previous embodiment, and only those portions which differ in structure have been illustrated. FIG. 8 is an exploded perspective view of the rotating member 46 of this embodiment. It differs from the rotating member 46 of FIG. 4 with respect to the shape of the guide groove. FIG. 9 is a schematic view of the guide groove. It includes a first groove section 54 and a second groove section 56 which are slightly staggered from each other in the axial and circumferential directions of the rotating member 46 and a junction section 58 which connects sections 54 and 56 with one another. The first groove section 54 is used for locking the steering shaft and therefore will be referred to as the locking groove section, while the second groove section 56 is used for unlocking the steering shaft and will be referred to as the unlocking groove section.

As shown in FIG. 10, the front surface of the cylindrical holder 44 is labelled with the abbreviations LOCK, OFF, ACC, ON, and START corresponding to the various angular positions of the key cylinder 24. These abbreviations have the same meanings as in the previous embodiment.

The unlocking groove section 56 has a ON position and a START position, while the locking groove section 54 has a LOCK position and an OFF position. The junction section 58 has an ACC position. As shown in FIG. 9, the projection 52 is at the ON or START position of the unlocking groove section 56 when the key cylinder 24 assumes the ON or START positions, respectively. The projection 52 is at the OFF or LOCK position of the locking groove section 54 when the key cylinder 24 is in its OFF or LOCK position, respectively. Furthermore, the projection 52 is in the ACC position of the junction section 58 when the key cylinder 24 is in its ACC position.

The portion of the junction section 58 which confronts the unlocking groove section 56 has a flat stopper surface 58a which is perpendicular to the longitudinal axis of the unlocking groove section 56. The portion of the junction section 58 which confronts the locking groove section 54 has an inclined, flat cam surface 58b for allowing the projection 52 to smoothly move from the locking groove section 54 to the unlocking groove section 56. The cam surface 58b is preferably inclined a about 45 degrees relative to the longitudinal axis of the locking groove section 54.

When the rotating member 46 and the key cylinder 24 are in the LOCK position of FIG. 10, the projection 52 of the latch 48 is positioned at the far left end of the locking groove section 54 in FIG. 9, and the key K can be pulled out of the key cylinder 24 with absolute safety.

When the rotating member 46 and the key cylinder 24 are rotated in the counterclockwise direction in FIG. 8 towards the START position, the projection 52 of the latch 48 slides inside the locking groove section 54 and comes into contact with the cam surface 58b of the junction section 58. The projection 52 is moved by the cam surface 58b from the locking groove section 54 into the unlocking groove section 56 and eventually reaches the START position at the far right end of the unlocking groove section 56 in FIG. 9.

When the rotating member 46 and the key cylinder 24 are rotated in the reverse direction from the START position towards the LOCK position, the rotation of the key cylinder 24 is stopped when the projection 52 comes into contact with the stopper surface 58a of the junction section 58. At this time, the driver can disengage the projection 52 from the stopper surface 58a by grasping the knob 50 of the latch 48 and pulling the latch 48 outwards. This will cause the projection 52 to move in the direction of arrow B in FIG. 9 from the unlocking groove section 56 into the locking groove section 54.

As in the previous embodiment, a detent mechanism can be employed to hold the latch 48 stationary when the projection 52 is in either of the groove sections 54 and 56. Any type of detent mechanism can be employed, such as the ones illustrated in FIGS. 7 and 8.

The operation of the embodiment of FIGS. 8 through 10 will now be described. It will be assumed that the key cylinder 24 is initially in the LOCK position of FIG. 10. In this state, the projection 52 of the latch 48 is at the far left end of the locking groove section 54 in FIG. 9, and thus the knob 50 of the latch 48 is in the OUT position shown by the phantom lines in FIG. 3.

When the engine key is manipulated and the key cylinder 24 and the rotating member 46 are rotated towards the START position, the projection 52 of the latch 48 slides inside the locking groove section 54. When the projection 52 comes into contact with the cam surface 58b of the junction section 58, the projection 52 is shifted to the unlocking groove section 56. Further rotation of the key cylinder 24 in the sam direction brings the projection 52 to the far right end of the unlocking groove section 56. Because of the provision of the cam surface 58b, the key cylinder 24 can be rotated towards the START position irrespective of any positions which the key cylinder 24 previously assumed.

When the key cylinder 24 is rotated in the reverse direction from the START position in order to stop the engine, the projection 52 slides in the unlocking groove section 56 towards the junction section 58 and comes into contact with the stopper surface 58a, so that further rotation of the key cylinder 24 is prevented. In this state, the operation of the engine stops. If the knob 50 of the latch 48 is then pulled out, the projection 52 is moved to the locking groove section 54 and is maintained stationary by the detent mechanism. In this condition, further rotation of the key cylinder 24 towards the LOCK position is permitted, and when the key cylinder 24 finally comes to the LOCK position, the key can be withdrawn from the key cylinder 24. Once the projection 52 of the latch 48 is shifted to the locking groove section 54 by pulling the knob 50 outwards, the latch 48 is maintained in the OUT position by the detent mechanism. Thus, once the knob 50 is pulled out, further rotation of the key cylinder 24 toward the LOCK position ca be achieved without manipulating the knob 50.

As is clear from the preceding description, a steering lock according to the present invention prevents a steering shaft of a vehicle from being locked unless the driver of the vehicle first manipulates a slidable latch. Therefore, the driver can be prevented from inadvertently locking the steering shaft while the vehicle is moving. In addition, the driver does not need to operate the latch and the ignition key simultaneously, so the driver can lock the steering shaft using only one hand. Furthermore, the driver can unlock the steering shaft and restart the vehicle without having to again manipulate the latch, so operation of the steering lock is extremely easy.

What is claimed is:

1. A steering lock device comprising:
   a housing;
   a key cylinder rotatably disposed in the housing;
   a generally cylindrical member rotatably disposed within the housing coaxially with the key cylinder and including an outer wall with a groove having a first circumferential groove section, a second circumferential groove section axially spaced from the first circumferential groove section, and a junction section connecting the first and second circumferential groove sections, the generally cylindrical member further including a first surface disposed at one end of the first groove section at the junction section and inclined at a predetermined angle to the first groove section and a second surface disposed at the end of the second groove section at the junction section and arranged generally perpendicular to the second groove section; and
   a latch slidably disposed within the housing and including a first end projecting outwardly from the housing and a second end projecting within the groove in the outer wall of the cylindrical member.

2. The steering lock device of claim 1 wherein the housing includes a casing and a cylindrical holder disposed within the casing, the key cylinder being rotatably disposed in the cylindrical member.

3. The steering lock device of claim 1 wherein the second groove section is closer to the key cylinder than the first groove section.

4. The steering lock device of claim 1 further comprising a detent mechanism coupled between the housing and the latch.

5. The steering lock device of claim 1 wherein the first surface and the second surface of the generally cylindrical member are disposed so that the second end of the latch passes between the first and second surfaces in moving from the first groove section to the second groove section.

6. The steering lock device of claim 1 wherein one of the first and second groove sections includes walls axially spaced from one another for restricting the axial movement of the second end of the latch.

7. The steering lock device of claim wherein the second end of the latch is movable in the junction section between a first position in which the second end of the latch is aligned with the first groove section and a second position in which the second end of the latch is aligned with the second groove section, the steering lock device further comprising detent means for maintaining the second end of the latch in either of the first and second positions, whereby an operator of the steering lock device can rotate the key cylinder when the second end of the latch is in the first position without having to hold the latch.

8. The steering lock device of claim 1 wherein the first end of the latch projects outwardly from the first side of the housing in the same direction as a key would project from the key cylinder.

9. The steering lock device of claim 1 further comprising a detent mechanism which is cooperatively arranged with the latch to disengage when the second end of the latch engages the first surface of the cylindrical member.

10. A steering lock device comprising:
a housing;
a key cylinder rotatably disposed in the housing;
a generally cylindrical member rotatably disposed in the housing coaxially with the key cylinder and including a cam area having a first circumferential groove section, a second circumferential groove section axially and circumferentially spaced from the first circumferential groove section, a junction section connecting the first and second circumferential groove sections, an inclined wall surface disposed at the end of the first groove section at the junction section and inclined at a predetermined angle to the first groove section, and a stopper wall surface disposed at the end of the second groove section at the junction section and arranged generally perpendicular to the second groove section, the second groove section being closer to the key cylinder than the first groove section; and
a latch slidably disposed within the housing and including a first end having a projection projecting into the cam area and a second end projecting outwardly from the housing, the latch being movable from an OUT position in which the second end is spaced from the housing and the projection is disposed in the second groove section to an IN position in which the second end is closer to the casing and the projection is disposed in the first groove section.

11. A steering lock device for locking a steering shaft of a wheeled vehicle when a key cylinder is turned to a given angular position, comprising:
a cylindrical rotating member which has a cylindrical outer wall and an axis and which rotates together with the key cylinder to lock the steering shaft when turned to a given position corresponding to the given angular position of the key cylinder;
a manually-operated latch which is slidable in a direction parallel with the axis of the rotating member, the latch having a projection directed toward the rotating member;
first means for defining about the cylindrical outer wall of the rotating member a coaxial groove in and along which the projection of the latch slides upon rotation of the rotating member about the axis thereof, the groove comprising first and second groove sections which are positioned away from each other in both the axial and circumferential directions of the rotating member and connected with each other through a junction section, the first groove section receiving the projection when the rotating member assumes the given position and the second groove section receiving the projection when the rotating member assumes positions other than the given position: and
second means for defining at the junction section an inclined flat surface which the projection contacts upon rotation of the rotating member toward positions other than the given position and is thereby shifted from the first groove section to the second groove section.

12. A steering lock device as claimed in claim 11, in which the manually-operated latch has a capped end which projects outward from a casing of the steering lock device to be manipulated from the outside.

13. A steering lock device as claimed in claim 11, further comprising third means which defines at the junction section a flat stopper surface which the projection contacts upon rotation of the rotating member toward the given position and is thereby prevented from further sliding in the groove toward the first groove section.

14. A steering lock as claimed in claim 13, in which the inclined flat surface is inclined with respect to the longitudinal axis of the first groove section, and in which the flat stopper surface is perpendicular to the longitudinal axis of the second groove section.

15. A steering lock device as claimed in claim 11, further comprising a detent mechanism for providing the movement of the manually-operated latch with a detent feeling.

16. A steering lock device as claimed in claim 15, in which the detent mechanism comprises two spaced notches formed in the manually-operated latch and a spring-biased ball partially disposed in a hole of a fixed member and pressed against the notched portion of the latch.

17. A steering lock device as claimed in claim 16, in which the fixed member is a cylindrical holder in which the key cylinder is rotatably disposed.

18. A steering lock device as claimed in claim 15, in which the detent mechanism comprises a resilient pawl integrally formed on the latch and a projection formed on a fixed member and arranged to be slidably engageable with the resilient pawl upon movement of the latch.

19. A steering lock device as claimed in claim 18, in which the fixed member is a cylindrical holder in which the key cylinder is rotatably disposed.

20. A steering lock device as claimed in claim 11, in which the projection of the manually-operated latch is placed in the first groove section when the key cylinder assumes a LOCK position, a SWITCH OFF position, or an ACCESSORY SWITCH ON position, and in which the projection of the latch is placed in the second groove section when the key cylinder assumes an ACCESSORY SWITCH ON position, an IGNITION SWITCH ON position, or a STARTER MOTOR ON position.

21. The steering lock device as claimed in claim 11 wherein the manually-operated latch has an end which projects outward from a casing of the steering lock device and wherein the latch is movable from a first position in which the end is spaced from the casing and the projection is in the second groove section to a second position in which the end is closer to the casing and the projection is in the first groove section.

22. A steering lock device comprising:

a housing;

a key cylinder rotatably disposed in the housing;

a generally cylindrical member rotatably disposed in the housing coaxially with the key cylinder and including a groove having a first circumferential groove section, a second circumferential groove section axially and circumferentially spaced from the first circumferential groove section, a junction section connecting the first and second circumferential groove sections, an inclined cam surface disposed at the end of the first groove section at the junction section and inclined at a predetermined angle to the first groove section, and a stopper wall surface disposed at the end of the second groove section at the junction section and arranged generally perpendicular to the second groove section, the first groove section being closer to the key cylinder than the second groove section; and a latch slidably disposed within the groove and including a first end having a projection projecting into the groove and a second end projecting outwardly from the housing, the latch being movable from a first position in which the second end is spaced from the housing and the projection is disposed in the first groove section to a second position in which the second end is closer to the housing and the projection is disposed in the second groove section.

23. The steering lock device of claim 22 wherein the housing includes a casing and a cylindrical holder positioned within the casing, the key cylinder being rotatably disposed in the cylindrical holder.

24. The steering lock device of claim 22 further comprising a detent mechanism coupled between the housing and the latch.

25. The steering lock device of claim 22 wherein the key cylinder and the cylindrical member are both rotatable between START, ON, OFF and LOCK positions and wherein the projection of the latch is disposed in the first groove section in the LOCK and OFF positions of the cylindrical member and is disposed in the second groove section in the ON and START positions of the cylindrical member.

26. A steering lock device for locking a steer shaft of a wheeled motor vehicle through a shaft-locking bar mechanism, the steering lock device comprising:

a key cylinder having first and second ends and being adapted to receive an ignition key, the ignition key being initially inserted into the first end of the key cylinder and slid toward the second end of the key cylinder;

a cylindrical rotating member mounted at the second end of the key cylinder and operating in unison with the key cylinder upon receipt of the ignition key in the key cylinder the rotating member being formed at is outer peripheral surface with an elongated cam extending between a LOCK position and a START position, the cam including a bottom surface located at a constant radial distance from the axis of the rotating member, a first wall extending parallel to the direction of movement of the key when the key is moved from the first end to the second end of the key cylinder, a second wall extending perpendicularly to the first wall, a third wall extending perpendicularly to the second wall and parallel to the first wall, a fourth wall extending perpendicularly to the third wall and parallel to the second wall, a fifth wall extending perpendicularly to the fourth wall and parallel to the first and third walls, a sixth wall extending parallel to and axially spaced from the fourth wall, and a seventh wall extending from the sixth wall at an angle to the sixth wall and in a direction away from the fourth wall, the first, second, third, fourth, fifth, sixth, and seventh walls extending consecutively and continuously and extending an equal distance from and perpendicular to the bottom surface, the cam including a first elongated section formed by the bottom surface and the second wall and terminating in the LOCK position at the first wall, a second elongated section formed by the bottom surface, the fourth wall, and the sixth wall and terminating in the START position at the fifth wall, and a junction section formed by the bottom surface, the third wall, and the seventh wall and connecting the first elongated section and the second elongated section, the first elongated section and the second elongated section extending parallel to each other and being separated from each other in both the axial and circumferential directions of the rotating member, the first elongated section being located closer to the second end of the key cylinder than the second elongated section;

a latch having a first end terminating in a knob located adjacent to the first end of the key cylinder and a second end having a projection which engages with the cam, the projection being slidable in a direction parallel to the axis of the key cylinder toward the second end of the key cylinder when moving from the second elongated section to the first elongated section through the junction section, being slidable in a direction parallel to an axis of the key cylinder away from the second end of the key cylinder when moving from the first elongated section to the second elongated section through the junction section, being slidable in a circumferential direction when moving from the LOCK position smoothly along the seventh wall to the START position, and being stopped by the third wall when moving from the START position through the junction section and abutting against the third wall, the projection being released from the third wall when the knob is pulled to move the projection into the first elongated section; and a detent mechanism coupled to the latch to hold the projection in on of the first and second elongated sections.

27. The steering lock device of claim 26 wherein the junction section is positioned at or in proximity to an ACC position.

* * * * *

UNITED STATES PATENT AND TRADEMARK OFFICE
CERTIFICATE OF CORRECTION

PATENT NO. : 5,092,147
DATED : MARCH 3, 1992
INVENTOR(S) : MOCHIDA ET AL.

It is certified that error appears in the above-identified patent and that said Letters Patent is hereby corrected as shown below:

Claim 7, column 8, line 67, after "claim" add --1--.

Claim 11, column 10, line 6, change ":" to --;--.

Claim 26, column 11, line 45, change "steer" to --steering--;
line 56, after "cylinder" add --,--
column 12, line 56, change "on" to --one--.

Signed and Sealed this

Twenty-second Day of June, 1993

Attest:

MICHAEL K. KIRK

Attesting Officer

Acting Commissioner of Patents and Trademarks